United States Patent
Waag et al.

(10) Patent No.: US 10,871,047 B2
(45) Date of Patent: Dec. 22, 2020

(54) DRILLING PLANT MACHINE AND METHOD OF OPERATION

(71) Applicant: MHWIRTH AS, Kristiansand (NO)

(72) Inventors: Tor Inge Waag, Kristiansand (NO); Sjur Henning Hollekim, Kristiansand (NO)

(73) Assignee: MHWIRTH AS, Kristiansand (NO)

( * ) Notice: Subject to any disclaimer, the term of this patent is extended or adjusted under 35 U.S.C. 154(b) by 185 days.

(21) Appl. No.: 16/088,822

(22) PCT Filed: Mar. 28, 2017

(86) PCT No.: PCT/NO2017/050076
§ 371 (c)(1),
(2) Date: Sep. 27, 2018

(87) PCT Pub. No.: WO2017/171557
PCT Pub. Date: Oct. 5, 2017

(65) Prior Publication Data
US 2019/0106980 A1    Apr. 11, 2019

(30) Foreign Application Priority Data
Mar. 30, 2016   (NO) .................................... 20160497

(51) Int. Cl.
*E21B 31/00*   (2006.01)
*E21B 44/08*   (2006.01)
*E21B 3/02*    (2006.01)

(52) U.S. Cl.
CPC .............. *E21B 31/035* (2020.05); *E21B 3/02* (2013.01); *E21B 31/00* (2013.01); *E21B 44/08* (2013.01)

(58) Field of Classification Search
CPC ........ E21B 31/03; E21B 31/035; E21B 44/08; E21B 3/02
See application file for complete search history.

(56) References Cited

U.S. PATENT DOCUMENTS

| | | |
|---|---|---|
| 3,092,181 A | 6/1963 | Alexander |
| 5,448,911 A | 9/1995 | Mason |
| 2004/0028476 A1 | 2/2004 | Payne et al. |
| 2011/0056750 A1 | 3/2011 | Lucon |
| 2012/0089336 A1* | 4/2012 | Garvey ................... E21B 47/00 702/9 |

(Continued)

OTHER PUBLICATIONS

J. L. Mercado et al.: "Planning for Successful Jarring Operations—Effective Use of Drilling Impact System Helps Release Stuck Pipe", SPE/IADC 163413, Drilling Conference and Exhibition, SPE/IADC 163413, pp. 1-9 (Mar. 5-7, 2013), Amsterdam.

(Continued)

*Primary Examiner* — D. Andrews
(74) *Attorney, Agent, or Firm* — Norman B. Thot (57) ABSTRACT

A method for operating a drilling plant machine includes providing a drilling plant machine which includes a sensor which measures a parameter which is indicative of a jarring load acting on the drilling plant machine from a drill string, providing a set of values representing readings from the sensor, identifying a jarring event, and determining a magnitude of the parameter from the set of values.

23 Claims, 3 Drawing Sheets

(56) References Cited

U.S. PATENT DOCUMENTS

2016/0290045 A1 10/2016 Heinrichs et al.

OTHER PUBLICATIONS

T.V. Aarrestad et al.: "Loads on Drillpipe During Jarring Operations", Society of Petroleum Engineers, SPE Drilling & Completion, pp. 271-275, (Dec. 1994).
A.W. Eustes III: "A Frequency Domain Approach to Drillstring Jarring Analysis", PhD Thesis Colorado School of Mines, pp. 1-249 (1996).

* cited by examiner

DRILLING PLANT MACHINE AND METHOD OF OPERATION

CROSS REFERENCE TO PRIOR APPLICATIONS

This application is a U.S. National Phase application under 35 U.S.C. § 371 of International Application No. PCT/NO2017/050076, filed on Mar. 28, 2017 and which claims benefit to Norwegian Patent Application No. 20160497, filed on Mar. 30, 2016. The International Application was published in English on Oct. 5, 2017 as WO 2017/171557 A1 under PCT Article 21(2).

FIELD

The present invention relates to a drilling plant machine and to a method of operating a drilling plant machine.

BACKGROUND

During drilling operations, the drill pipe can sometimes become stuck in the well. This situation that can lead to severe loss of time or even the need to abandon a section of the well. One possible solution to such a problem is to perform a jarring operation. Jarring is a sudden axial movement induced to the drill string to free stuck pipe. Jarring may involve using the drill string itself as a mechanical spring, and a pre-installed component of the bottom hole assembly called a jar, which, after being triggered by a sequence of forces applied to the drill string, suddenly releases stored mechanical spring energy.

The severe mechanical stress experienced in this process can be harmful to the integrity of components of the drilling system, e.g., bearings, shafts and subs. See, for example, "Loads on Drillpipe During Jarring Operations" by TV Aarrestad and Å Kyllingstad, Society of Petroleum Engineers paper SPE-24970-PA, and "A Frequency Domain Approach to Drillstring Jarring Analysis", PhD Thesis Colorado School of Mines, 1996, by Alfred William Eustes III. Jarring is assumed to have a negative effect on the condition, for example, of a drilling machine such as a top drive (see, e.g., WO 2014/146910), particularly when used at shallow well depths (e.g., top hole drilling). A manual inspection (so-called "inspection after jarring") is usually carried out to determine the extent of potential damage. This is time consuming and represents both a safety hazard and a high cost for the rig operator. Critical main components of the drilling machine may be hard to access for inspection, and dismantling may be required.

Other documents which may be useful for understanding the background of the present invention include US 2011/0056750 A1, US 2004/0028476 A1, and MERCADO, J. L. "Planning for successful jarring operations-Effective use of drilling impact systems helps release stuck pipe", SPE 163413, SPE/IADC Drilling Conference, 5-7 March, Amsterdam, The Netherlands 2013.

SUMMARY

An aspect of the present invention is to provide an improved method and system which reduces or eliminates the above mentioned and other disadvantages associated with known systems and techniques in order to provide the fitness-for-purpose and operational reliability of various types of drilling plant machines.

In an embodiment, the present invention provides a method for operating a drilling plant machine which includes providing a drilling plant machine comprising a sensor which is configured to measure at least one parameter which is indicative of a jarring load acting on the drilling plant machine from a drill string, providing a set of values representing readings from the sensor, identifying a jarring event, and determining a magnitude of the at least one parameter from the set of values.

BRIEF DESCRIPTION OF THE DRAWINGS

The present invention is described in greater detail below on the basis of embodiments and of the drawings in which.

DETAILED DESCRIPTION

In an embodiment, the present invention provides a method for operating a drilling plant machine, the method comprising the steps of: providing a sensor on the drilling plant machine, the sensor being operable to measure at least one parameter indicative of a jarring load acting on the drilling plant machine from a drill string; providing a set of values representing readings from the sensor; identifying a jarring event; and determining a magnitude of the parameter from the set of values.

In an embodiment, the sensor can, for example, be a force sensor, a vibration sensor, a displacement sensor, or an acceleration sensor.

In an embodiment, the at least one parameter can, for example, be or can, for example be a function of at least one of:

a force acting on the drilling plant machine,
a displacement of the drilling plant machine,
displacement of a component of the drilling plant machine,
an acceleration of the drilling plant machine,
a vibration amplitude of the drilling plant machine, and
a vibration frequency of the drilling plant machine.

In an embodiment, the step of identifying a jarring event can, for example, comprise: receiving a signal generated by an operator indicating that a jarring event has been executed, and/or comparing the magnitude of the parameter to a first pre-determined threshold value, the first pre-determined threshold value being indicative of a jarring event having taken place.

In an embodiment, the method can, for example, comprise the step of determining a time at which the jarring event occurred.

In an embodiment, the step of determining a magnitude of the parameter can, for example, include: determining a time period ($t_j$) encompassing the time ($t_1$), and determining at least one of:

(i) a peak value of the parameter in the time period,
(ii) an average value of the parameter in the time period, and
(iii) a median value of the parameter in the time period.

In an embodiment, the method can, for example, further comprise the step of outputting a first signal indicative of the magnitude of the parameter.

In an embodiment, the method can, for example, include the step of:
   providing a maintenance scheduling system, the maintenance scheduling system being configured to:
      receive the magnitude of the parameter, and
      output a second signal if the magnitude of the parameter exceeds a second pre-determined threshold value, the second signal being indicative of a need to carry out maintenance on the drilling plant machine.

In an embodiment, the drilling plant machine can, for example, comprise a first component and a second component, and the maintenance scheduling system can, for example, be configured to:
   output a third signal if the magnitude of the parameter exceeds a third pre-determined threshold value, the third signal being indicative of a need to carry out maintenance on the first component.

In an embodiment, the maintenance scheduling system can, for example, be configured to:
   output a fourth signal if the magnitude of the parameter exceeds a fourth pre-determined threshold value, the fourth signal being indicative of a need to carry out maintenance on the second component.

In an embodiment, the method can, for example, include the steps of:
   providing a maintenance scheduling system, the maintenance scheduling system being configured to:
      output a first value, the first value being indicative of a remaining useful lifetime of the drilling plant machine,
      receive the magnitude of the parameter,
      calculate a second value, the second value being a function of the first value and the magnitude of the parameter, the second value being indicative of an updated remaining useful lifetime of the drilling plant machine, and
      output the second value.

In an embodiment, the drilling plant machine can, for example, be a drilling machine. In an embodiment, the drilling machine can, for example, be a top drive.

In an embodiment, the drilling plant machine can, for example, be a hoisting machine, a heave compensator, or a power tong machine.

In an embodiment, there can, for example, be provided a tangible computer readable medium with instructions stored thereon which, when executed by a processor, cause the processor to perform the steps of a method for operating a drilling plant machine.

In an embodiment, there can, for example, be provided a drilling system including:
   a drilling plant machine,
   a sensor operable to measure at least one parameter indicative of a jarring load acting on the drilling plant machine from a drill string, and
   a processor configured to receive a set of values measured by the sensor and to determine a magnitude of the parameter from the set of values.

In an embodiment, the sensor can, for example, be a force sensor, a vibration sensor, a displacement sensor, or an acceleration sensor.

In an embodiment, the at least one parameter can, for example, be or can, for example, be a function of at least one of:
   a force acting on the drilling plant machine,
   a displacement of the drilling plant machine,
   displacement of a component of the drilling plant machine,
   an acceleration of the drilling plant machine,
   a vibration amplitude of the drilling plant machine, and
   a vibration frequency of the drilling plant machine.

In an embodiment, the processor can, for example, be configured to identify a jarring event:
   if a signal generated by an operator indicates that a jarring event has been executed, and/or
   if the magnitude of the parameter exceeds a first pre-determined threshold value, the first pre-determined threshold value being indicative of a jarring event having taken place.

In an embodiment, the processor can, for example, be configured to determine a time at which the jarring event occurred.

In an embodiment, the processor can, for example, be configured to:
   determine a time period encompassing the time, and
   determine at least one of:
   (i) a peak value of the parameter in the time period,
   (ii) an average value of the parameter in the time period, and
   (iii) a median value of the parameter in the time period.

In an embodiment, the processor can, for example, be configured to output a first signal indicative of the magnitude of the parameter.

In an embodiment, the drilling system can, for example, include a maintenance scheduling system, the maintenance scheduling system being configured to:
   receive the magnitude of the parameter, and
   output a second signal if the magnitude of the parameter exceeds a second pre-determined threshold value, the second signal being indicative of a need to carry out maintenance on the drilling plant machine.

In an embodiment, the drilling plant machine can, for example, comprise a first component and a second component, and
   the maintenance scheduling system can, for example, be configured to output a third signal if the magnitude of the parameter exceeds a third pre-determined threshold value, the third signal being indicative of a need to carry out maintenance on the first component.

In an embodiment, the maintenance scheduling system can, for example, be configured to output a fourth signal if the magnitude of the parameter exceeds a fourth pre-determined threshold value, the fourth signal being indicative of a need to carry out maintenance on the second component.

In an embodiment, the drilling system can, for example, include a maintenance scheduling system, the maintenance scheduling system being configured to:
   output a first value, the first value being indicative of a remaining useful lifetime of the drilling plant machine,
   receive the magnitude of the parameter,
   calculate a second value, the second value being a function of the first value and the magnitude of the parameter, the second value being indicative of an updated remaining useful lifetime of the drilling plant machine, and
   output the second value.

In an embodiment, the drilling plant machine can, for example, be a drilling machine. In an embodiment, the drilling machine can, for example, be a top drive.

In an embodiment, the drilling plant machine can, for example, be a hoisting machine, a heave compensator, or a power tong machine.

Figure 1:
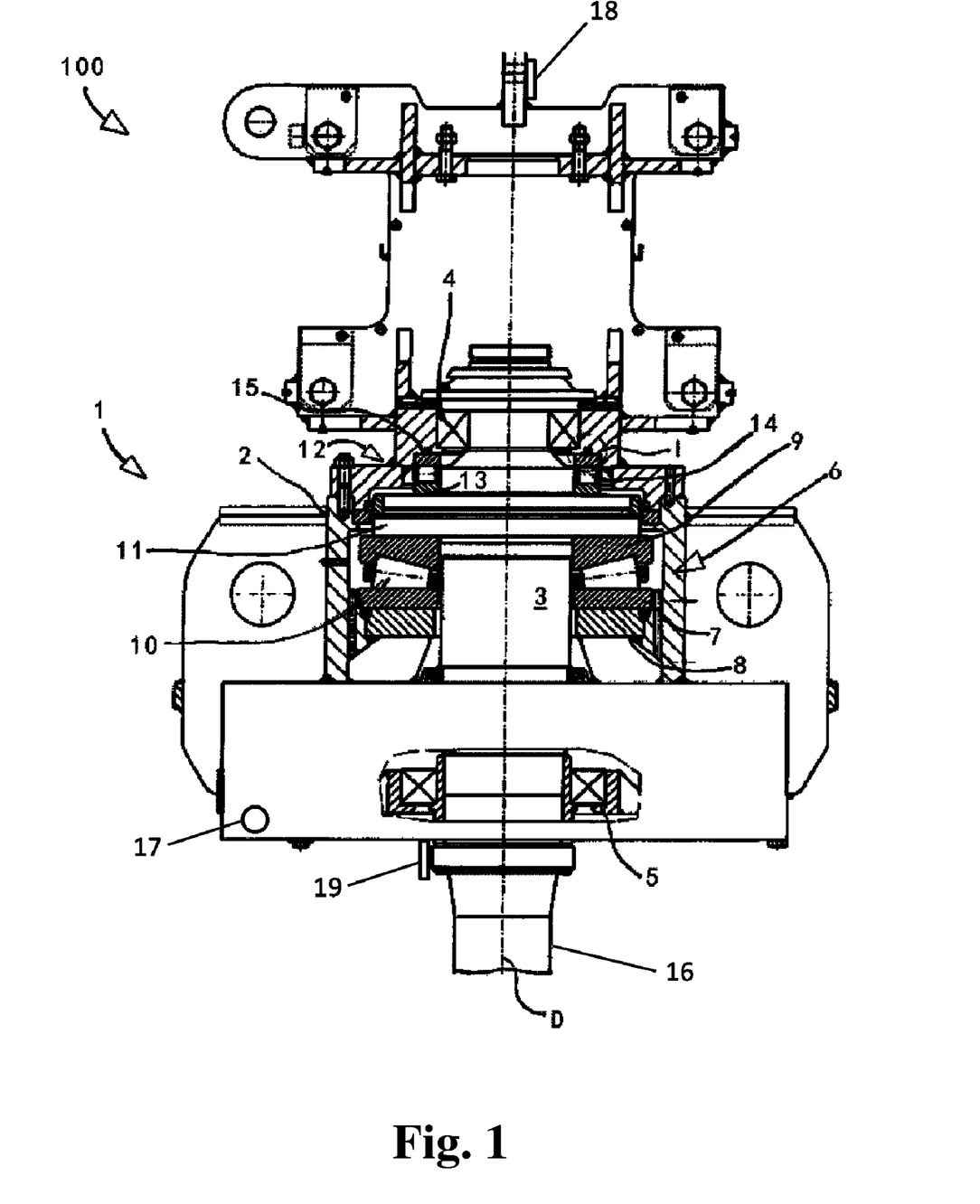
FIG. 1 shows a top drive drilling machine suitable for use with the present invention.

FIG. 1 shows a drilling plant machine, which in the shown embodiment is a top drive drilling machine 100. The top drive drilling machine 100 comprises a gear unit 1 having a gear housing 2. In the gear housing 2, a main spindle 3 is mounted rotatably about an axis of rotation D. The main spindle 3 provides an externally toothed spur gear (not shown in the drawings as it is covered by parts of the gear housing) on which spur gear is coupled a typically hydraulically or electrically driven drive motor (also not shown in the drawings). The main spindle 3 is radially mounted in the gear housing 2 by an upper radial bearing 4 and by a lower radial bearing 5. An axial main bearing 6 is provided between the upper radial bearing 4 and the lower radial bearing 5. The axial main bearing 6 comprises a lower main bearing part 7 which rests on a flange 8 of the gear housing 2. The axial main bearing 6 further comprises an upper main bearing part 9 which is supported on the lower main bearing part 7 via conical rollers 10. The main spindle 3 abuts the upper main bearing part 9 with a radial flange 11. The main spindle 3 is thus secured from below against displacement with the aid of the axial main bearing 6 according to FIG. 1.

An axial auxiliary bearing 12 is provided in order to also hold the main spindle 3 in an axial position against possible forces acting from below during operation according to FIG. 1, or during storage or during transport while not in the operating position of the top drive. The axial auxiliary bearing 12 comprises a lower auxiliary bearing part 13 which is supported from above by the radial flange 11. An upper auxiliary bearing part 15 is supported via bearing rollers 14 on the lower auxiliary bearing part 13. The upper auxiliary bearing part 15 is mounted in the gear housing 2. Between the upper auxiliary bearing part 15 and the gear housing 2 and/or between the lower auxiliary bearing part 13 and the radial flange 11, spacers (which are not shown in the drawings) may be provided to compensate at least for coarse tolerances.

During a jarring event, as the jar releases, the downwards force by the drill string 16 acting on the top drive drilling machine 100 may be suddenly reduced with a magnitude in the order of tens of tons. Significant oscillations may also be induced in the drill string 16 and the top drive drilling machine 100. This may damage or reduce the operational lifetime of various components in the top drive drilling machine 100, such as the axial main bearing 6, the upper radial bearing 4, and the lower radial bearing 5. Although jarring may lead to severe consequences for the condition of the drilling equipment, such jarring events are not always logged and reported by the crew. The impact of jarring events on the drilling machine may vary significantly, depending on, for example, the actual operating conditions (e.g., borehole depth and length of the drill string) and the energy required to free the drill bit.

At least one sensor is provided to measure the load to which the top drive drilling machine 100 is subjected during operation. This may include an accelerometer or acceleration sensor 17 which measures vibrations in the drilling machine itself or vibrations in the drill string 16 which is connected to the top drive drilling machine 100. The acceleration sensor 17 may be single-axis, two-axis or three-axis. Alternatively or additionally, a hook load sensor or force sensor 18 may provide measurements of the force from the lifting system on the top drive drilling machine 100. Alternatively or additionally, a displacement sensor 19 may provide measurements of the relative displacement of a section of the drill string 16 in relation to the housing of the top drive drilling machine 100. Alternatively or additionally, a displacement sensor (not shown in the drawings) may be provided to measure any axial movement of the axial main bearing 6 or axial auxiliary bearing 12.

Other types of sensors, or combinations of sensors, are also possible. Any type of sensor, or combination of sensors, which is able to measure parameters indicative of a jarring impact on the top drive drilling machine 100, and the magnitude thereof, may be suitable for this purpose.

Figure 2:
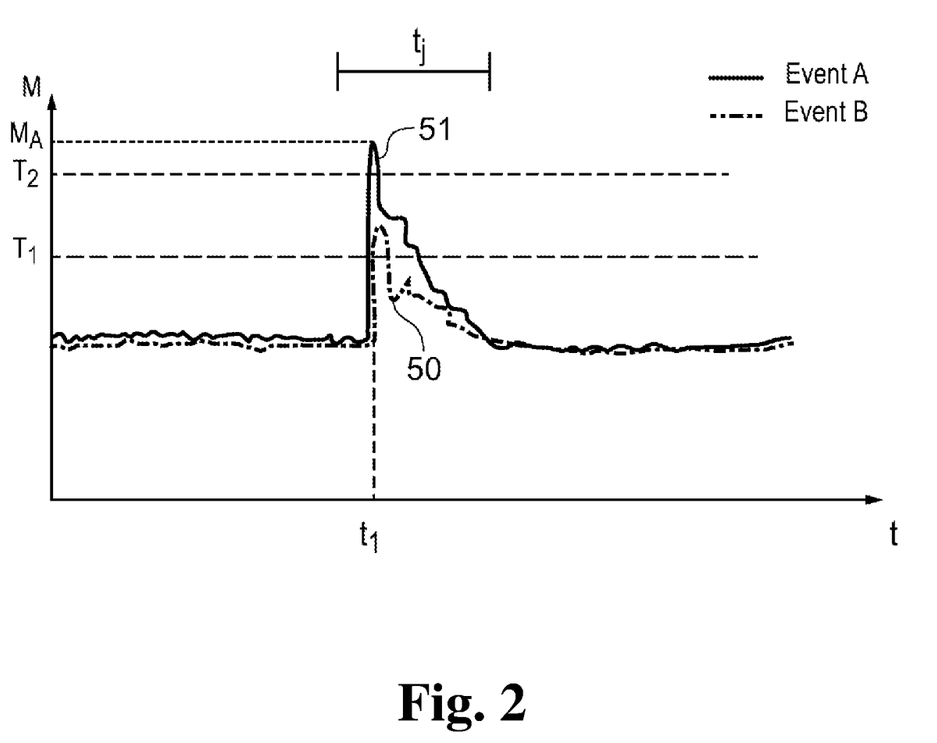
FIG. 2 shows operational readings from a drilling machine during a jarring event.

FIG. 2 illustrates two occurrences of jarring, i.e., of jarring events A and B. The graphs illustrate measurement readings 50 and 51 from the acceleration sensor 17, the measurement readings 50 and 51 indicated as vibration intensity M, which is indicative of a jarring load as seen by the top drive drilling machine 100. The vibration intensity M may, for example, be defined as the magnitude of the acceleration measured in three dimensions, i.e., $M=\sqrt{x^2+y^2+z^2}$, where x, y, z are the respective instantaneous, measured acceleration in each direction. The graphs of measurement readings 50 and 51 are normalized around a time at which each respective jarring event $t_1$ occurred. (It will be understood that they did not occur at the same time.)

In an embodiment, the method comprises the steps:
providing a sensor on the drilling machine, the sensor being operable to measure at least one parameter indicative of a jarring load acting on the drilling machine;
providing a set of values representing readings from the sensor;
identifying a jarring event; and
determining a magnitude of the parameter from the set of values.

The sensor may be a force sensor 18, a displacement sensor 19, an acceleration sensor 17, or a different type of sensor. The sensors 17,18,19 may thus measure a parameter in the form of a force acting on the drilling machine, for example, the force from the drill string 16 or the hook load. The sensor may alternatively measure a displacement of the drilling machine, e.g., an oscillation or displacement of the drilling machine as a response to a rapid change in the force from the drill string 16, triggered by the jarring event. The sensor may alternatively measure a displacement of a component of the drilling machine, e.g., axial movement of the main spindle 3 in relation to the top drive housing or other components, such as bearing parts. The sensor may alternatively measure an acceleration and/or a vibration intensity of the drilling machine triggered by the force variations or vibrations from the drill string (e.g., longitudinal vibrations travelling up the drill string as a result of the jar releasing). Yet another alternative may include measuring or calculating the parameter as representing the rate of change of, for example, a force acting on the drilling machine or a displacement of the drilling machine. Because of the sudden nature of a jarring event, the rate of change may provide a useful indicator for the impact of the jarring event on the drilling machine. The parameter (or parameters) may be continuously measured and logged, for example, using a computer-based monitoring and control system 30 (see FIG. 3).

Identifying that a jarring event has taken place may be done by a signal generated by an operator indicating that a jarring event has been executed. When the operator commands the jar to release, for example, that signal may also be used for the purpose of the present method.

The jarring event may alternatively be identified by comparing the magnitude of the measured parameter to a pre-determined threshold value, whereby, if the measurement exceeds the threshold, the exceeding can be taken as an indication that a jarring event has taken place. For example, in the jarring event A shown in FIG. 2, a vibration intensity exceeding threshold $T_1$ may be taken to indicate that a jarring event has taken place. In this case, the jarring event would thus be detected independent of whether this information was provided through an operator.

Figure 3:
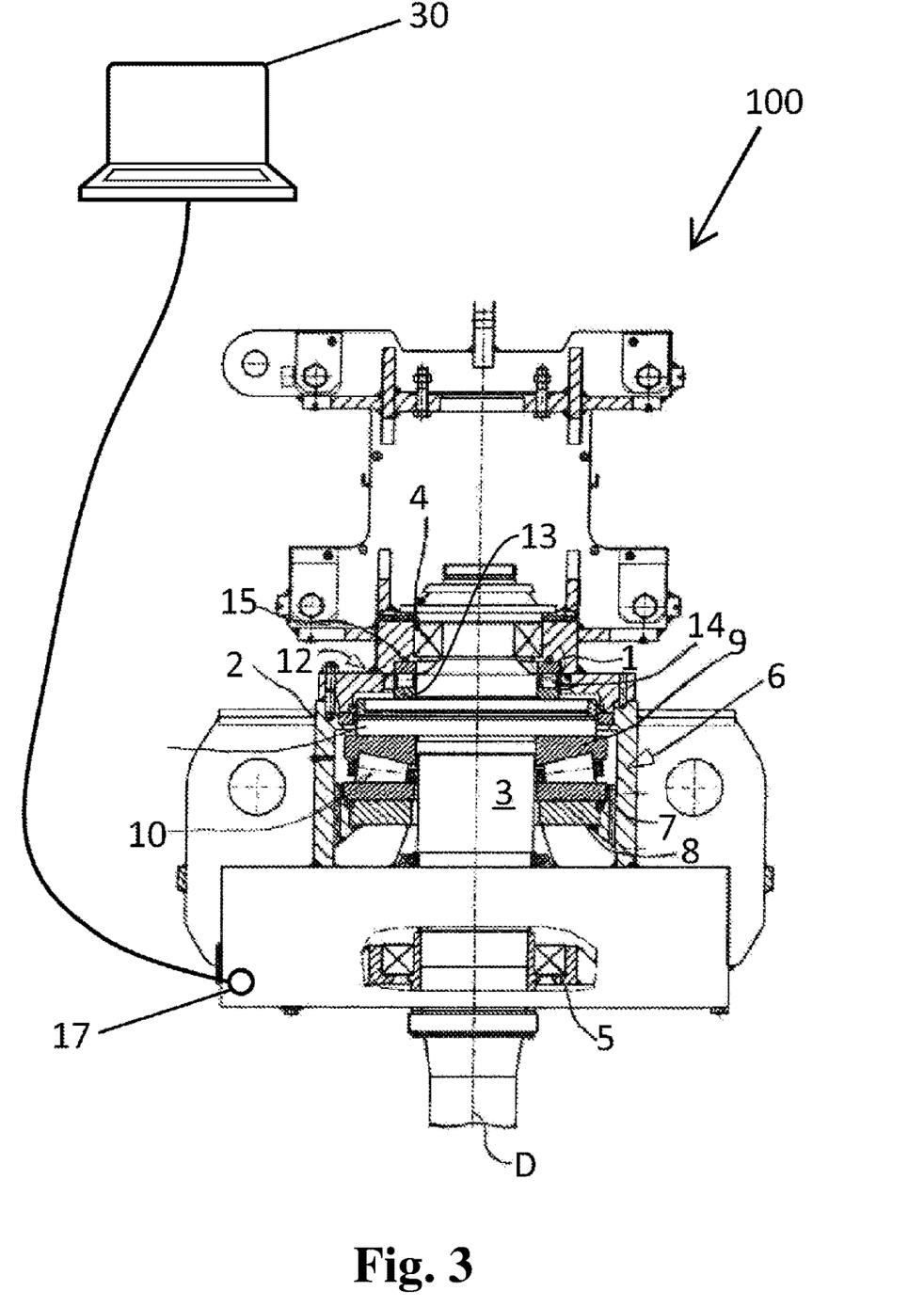
FIG. 3 shows a top drive drilling machine in accordance with an embodiment of the present invention.

One may also determine the time at which the jarring event occurred. The time $t_1$ may be determined and logged using the computer-based monitoring and control system 30, which receives data from the sensors, e.g., the acceleration sensor 17.

A set of readings from the acceleration sensor 17 may be provided as measurement values from which a magnitude of the measured parameter, in this case, the vibration intensity based on the acceleration sensor readings, may be calculated. The calculations may be performed with the computer-based monitoring and control system 30. The calculations may be performed by defining a time period $t_J$ (see FIG. 2) around the time of the jarring event $t_1$, or, alternatively, a time immediately following the time of the jarring event $t_1$. The magnitude may be taken as the peak value of the parameter in the time period $t_J$. For example, as illustrated in FIG. 2, the peak value $M_A$ of vibration intensity for jarring event A may be determined from a subset of readings 51 from the sensor. This value provides an indicator of the impact that the jarring event had on the drilling machine. An average value or a median value of the parameter over the time period $t_J$ may alternatively be used.

A signal may be output indicating the magnitude of the measured parameter. The signal may, for example, be an audible or visual signal to an operator via the computer-based monitoring and control system 30.

In an embodiment, the computer-based monitoring and control system 30 can, for example, comprise a maintenance scheduling system which receives the magnitude of the measured parameter and is configured to output a signal if the magnitude of the parameter exceeds a pre-determined threshold value, where the signal is indicative of a need to carry out maintenance on the drilling machine. The signal may be an audible or a visual signal to an operator. In the example illustrated in FIG. 2, for example, a jarring event leading to a vibration intensity exceeding a threshold $T_2$ may require an immediate inspection of the drilling machine. Via the maintenance scheduling system, an operator may be alerted immediately thereof in the case of jarring event A, so that inspection after jarring can be carried out, whereas, for example, for jarring event B, this would not be necessary and drilling operations may continue.

In an embodiment, the drilling machine can, for example, comprise a first component and a second component, and individual or different thresholds are defined for triggering maintenance signals for the first component and/or the second component. In the two jarring events illustrated in FIG. 2, for example, a threshold $T_1$ for the vibration intensity may be defined which would require inspection of the axial main bearing 6 of the top drive drilling machine 100, while a threshold $T_2$ may be defined which would require inspection of the upper radial bearing 4 and the lower radial bearing 5. For the jarring event A, the need for inspection of all bearings would thus be signaled to the operator, for example, by an audible or visual signal from the computer-based monitoring and control system 30, while for jarring event B, only the need for inspection of the axial main bearing 6 would be signaled.

The operator may thus, for example, avoid having to carry out a full inspection after each jarring event. In an embodiment, the system can, for example, be configured so that the operator is immediately notified if the magnitude of the jarring event was sufficiently high so that an immediate full inspection after jarring procedure is required. This allows the operator to optimize inspection after jarring in that only those components which are likely to have been damaged by the given jarring load magnitude need to be inspected for damage, thus reducing the downtime required for inspections.

In an embodiment, there can, for example, be provided a maintenance scheduling system for planning maintenance activities, where the maintenance scheduling system provides the operator with information relating to the next required maintenance of the drilling machine. The information may, for example, be the number of operating hours before maintenance is required. The information may alternatively be a projected future time at which maintenance must be carried out. This information may collectively be referred to as the remaining useful lifetime for the drilling machine.

The maintenance scheduling system may be configured to receive the magnitude of the measured parameter from a jarring event, and calculate a new, updated remaining useful lifetime value for the drilling machine. The updated remaining useful lifetime value may be a function of the projected remaining useful lifetime provided before the jarring event, and the magnitude of the measured parameter. This allows the maintenance scheduling system to take the intensity or impact of the jarring event into consideration when calculating an updated remaining useful lifetime and maintenance plan, and to output this to the operator.

For example, in the example shown in FIG. 2, the drilling machine may have 1500 operating hours of remaining useful lifetime before maintenance is required. The impact of the jarring events may be taken into account by the maintenance scheduling system so that the jarring event B may trigger the maintenance scheduling system to advance the maintenance by 100 operating hours, i.e., output a new remaining useful lifetime of 1400 h. The jarring event A, having a higher impact than event B, may, for example, trigger an advance in the maintenance timing by 300 operating hours.

This permits the actual jarring loads experienced by the drilling machine to be taken into account in setting up or adjusting a maintenance schedule. For example, if the drilling machine is subjected to repeated, high-impact jarring loads, the remaining useful lifetime of the machine will deteriorate much faster than during normal operation. By revising a maintenance schedule based on the actual jarring loads, more efficient maintenance can be carried out, thus improving component lifetime and also improving operational safety by reducing the risk of failure and/or unplanned downtime.

In an embodiment, it is therefore possible, for example, to provide the driller or operator with an inspection schedule which better accords with the actual loads experienced by the drilling machine, thus providing that sufficient inspection is carried out, but at the same time avoiding downtime for a more detailed inspection than is in fact necessary.

While the embodiments described above are exemplified with a top drive drilling machine 100, it should be noted that systems or methods according to the present invention can be used with any type of drilling plant machine (i.e., machines used on a drilling plant) which may be in direct or indirect contact with the drill string 16 during operation of the drilling plant, and thus be subjected to jarring loads. Other types of drilling plant machines includes, but are not limited to, hoisting machines (such as cylinder hoisting rigs or drawworks), heave compensators, and power tong machines (such as iron roughnecks).

The present invention is not limited to embodiments described herein; reference should also be had to the appended claims.

What is claimed is:

1. A method for operating a drilling plant machine, the method comprising:
   providing a drilling plant machine comprising a sensor which is configured to measure at least one parameter which is indicative of a jarring load acting on the drilling plant machine from a drill string;
   providing a set of values representing readings from the sensor;
   identifying a jarring event; and
   determining a magnitude of the at least one parameter from the set of values,
   wherein the identifying of the jarring event comprises at least one of:
      receiving a signal generated by an operator indicating that a jarring event has been executed, and
      comparing the magnitude of the at least one parameter to a first pre-determined threshold value, the first pre-determined threshold value being indicative that a jarring event has taken place.

2. The method as recited in claim 1, wherein the sensor is a force sensor, a vibration sensor, a displacement sensor, of an acceleration sensor.

3. The method as recited in claim 1, wherein the at least one parameter is or is a function of at least one of:
   a force acting on the drilling plant machine,
   a displacement of the drilling plant machine,
   a displacement of a component of the drilling plant machine,
   an acceleration of the drilling plant machine,
   a vibration amplitude of the drilling plant machine, and
   a vibration frequency of the drilling plant machine.

4. The method as recited in claim 1, further comprising:
   determining a time ($t_1$) at which the jarring event occurred.

5. The method as recited in claim 4, wherein the determining of the magnitude of the at least one parameter from the set of values includes:
   determining a time period ($t_j$) encompassing the time ($t_1$) at which the jarring event occurred, and
   determining at least one of:
      a peak value of the at least one parameter in the time period,
      an average value of the at least one parameter in the time period, and
      a median value of the at least one parameter in the time period.

6. The method as recited in claim 1, further comprising:
   outputting a first signal which is indicative of the magnitude of the at least one parameter.

7. The method as recited in claim 6, further comprising:
   providing a maintenance scheduling system which is configured to,
      receive the magnitude of the at least one parameter, and
      output a second signal if the magnitude of the parameter exceeds a second pre-determined threshold value, the second signal being indicative of a need to perform maintenance on the drilling plant machine.

8. The method as recited in claim 7, wherein,
   the drilling plant machine further comprises a first component and a second component, and
   the maintenance scheduling system is further configured to output a third signal if the magnitude of the at least one parameter exceeds a third pre-determined threshold value, the third signal being indicative of a need to perform maintenance on the first component.

9. The method as recited in claim 8, wherein the maintenance scheduling system is further configured to output a fourth signal if the magnitude of the at least one parameter exceeds a fourth pre-determined threshold value, the fourth signal being indicative of a need to perform maintenance on the second component.

10. The method as recited in claim 1, further comprising:
    providing a maintenance scheduling system, the maintenance scheduling system being configured to:
       output a first value which is indicative of a remaining useful lifetime of the drilling plant machine,
       receive the magnitude of the at least one parameter,
       calculate a second value which is a function of the first value and the magnitude of the at least one parameter, the second value being indicative of an updated remaining useful lifetime of the drilling plant machine, and
       output the second value.

11. The method as recited in claim 1, wherein the drilling plant machine is,
    a drilling machine,
    a top drive,
    a hoisting machine,
    a heave compensator, or
    a power tong machine.

12. A non-transitory tangible computer readable medium comprising instructions stored thereon which, when executed by a processor, causes the processor to perform the steps of the method as recited in claim 1.

13. A drilling system comprising:
    a drilling plant machine;
    a sensor configured to measure at least one parameter which is indicative of a jarring load acting on the drilling plant machine from a drill string; and
    a processor configured to receive a set of values measured by the sensor and to determine a magnitude of the at least one parameter from the set of values,
    wherein the processor is configured to identify the jarring event if at least one of,
       a signal generated by an operator indicates that a jarring event has been executed, and
       the magnitude of the at least one parameter exceeds a first pre-determined threshold value, the first pre-determined threshold signal being indicative of the jarring event having taken place.

14. The drilling system as recited in claim 13, wherein the sensor is a force sensor, a vibration sensor, a displacement sensor, or an acceleration sensor.

15. The drilling system as recited in claim 14, wherein the at least one parameter is or is a function of at least one of:
    a force acting on the drilling plant machine,
    a displacement of the drilling plant machine,
    a displacement of a component of the drilling plant machine,
    an acceleration of the drilling plant machine,
    a vibration amplitude of the drilling plant machine, and
    a vibration frequency of the drilling plant machine.

16. The drilling system as recited in claim 13, wherein the processor is further configured to determine a time ($t_1$) at which the jarring event occurred.

17. The drilling system as recited in claim 16, wherein the processor is further configured to,
    determine a time period ($t_j$) encompassing the time ($t_1$) at which the jarring event occurred, and
    determine at least one of:

a peak value of the at least one parameter in the time period, an average value of the at least one parameter in the time period, and a median value of the at least one parameter in the time period.

18. The drilling system as recited in claim 13, wherein the processor is further configured to output a first signal which is indicative of the magnitude of the at least one parameter.

19. The drilling system as recited in claim 18, further comprising:
a maintenance scheduling system which is configured to:
receive the magnitude of the at least one parameter, and
output a second signal if the magnitude of the at least one parameter exceeds a second pre-determined threshold value, the second signal being indicative of a need to perform maintenance on the drilling plant machine.

20. The drilling system as recited in claim 19, wherein, the drilling plant machine further comprises a first component and a second component, and
the maintenance scheduling system is further configured to output a third signal if the magnitude of the at least one parameter exceeds a third pre-determined threshold value, the third signal being indicative of a need to perform maintenance on the first component.

21. The drilling system as recited in claim 20, wherein the maintenance scheduling system is further configured to output a fourth signal if the magnitude of the at least one parameter exceeds a fourth pre-determined threshold value, the fourth signal being indicative of a need to perform maintenance on the second component.

22. The drilling system as recited in claim 18, further comprising:
a maintenance scheduling system which is configured to:
output a first value which is indicative of a remaining useful lifetime of the drilling plant machine,
receive the magnitude of the at least one parameter,
calculate a second value which is a function of the first value and the magnitude of the at least one parameter, the second value being indicative of an updated remaining useful lifetime of the drilling plant machine, and
output the second value.

23. The drilling system as recited in claim 13, wherein the drilling plant machine is
a drilling machine,
a top drive,
a hoisting machine,
a heave compensator, or
a power tong machine.

* * * * *